(12) United States Patent
Wagner (10) Patent No.: US 11,762,831 B2
(45) Date of Patent: Sep. 19, 2023

(54) ADAPTIVE SPARSE INDEXING IN CLOUD-BASED DATA WAREHOUSES

(71) Applicant: Firebolt Analytics Ltd., Tel Aviv (IL)

(72) Inventor: Benjamin Wagner, Munich (DE)

(73) Assignee: FIREBOLT ANALYTICS LTD., Tel Aviv (IL)

( * ) Notice: Subject to any disclaimer, the term of this patent is extended or adjusted under 35 U.S.C. 154(b) by 0 days.

(21) Appl. No.: 17/670,555

(22) Filed: Feb. 14, 2022

(65) Prior Publication Data

US 2023/0259501 A1    Aug. 17, 2023

(51) Int. Cl.
  *G06F 16/22* (2019.01)
  *G06F 11/34* (2006.01)
  *G06F 16/2453* (2019.01)

(52) U.S. Cl.
  CPC ...... *G06F 16/2272* (2019.01); *G06F 11/3457* (2013.01); *G06F 16/24539* (2019.01)

(58) Field of Classification Search
  CPC .................. G06F 16/2272; G06F 16/24539
  See application file for complete search history.

(56) References Cited

U.S. PATENT DOCUMENTS

| | | | | |
|---|---|---|---|---|
| 8,086,598 | B1* | 12/2011 | Lamb | G06F 16/24544 707/606 |
| 8,566,308 | B2* | 10/2013 | Musial | G06F 16/2272 707/719 |
| 11,294,905 | B2* | 4/2022 | Cheriton | G06F 16/2228 |
| 2002/0029207 | A1* | 3/2002 | Bakalash | G06F 16/24539 |
| 2008/0033914 | A1* | 2/2008 | Cherniack | G06F 16/283 |
| 2008/0040348 | A1* | 2/2008 | Lawande | G06F 16/22 |
| 2010/0250504 | A1* | 9/2010 | Balasubramanian | G06F 16/217 707/696 |
| 2011/0264667 | A1* | 10/2011 | Harizopoulos | G06F 16/221 707/E17.085 |
| 2015/0310066 | A1* | 10/2015 | Beavin | G06F 16/24542 707/716 |
| 2016/0321145 | A1* | 11/2016 | Fang | G06F 11/1451 |
| 2017/0139816 | A1* | 5/2017 | Sapozhnikov | G06F 11/3664 |
| 2017/0351721 | A1* | 12/2017 | le Mar | G06F 16/24542 |
| 2019/0197175 | A1* | 6/2019 | Purcell | G06F 16/2425 |
| 2020/0218725 | A1* | 7/2020 | Cheriton | G06F 16/2228 |

OTHER PUBLICATIONS

Chaudhuri et al., "AutoAdmin 'What-if' Index Analysis Utility," ACM SIGMOD (1998), pp. 367-378, year 1998.

(Continued)

*Primary Examiner* — Merilyn P Nguyen
(74) *Attorney, Agent, or Firm* — KLIGLER & ASSOCIATES PATENT ATTORNEYS LTD (57) ABSTRACT method for querying a data storage includes receiving queries for execution in the data storage, and deriving from the queries one or more table-scans over one or more tables of the data storage. Candidate sparse indexes, for pruning the table-scans, are specified based on the queries. Pruning-power measures, indicative of as effectiveness of the candidate sparse indexes in pruning the table-scans, are evaluated. One or more of the candidate sparse indexes are converted into actual sparse indexes, depending on the pruning-power measures. The queries are executed by performing the table-scans, including pruning the table-scans using the actual sparse indexes.

17 Claims, 4 Drawing Sheets

(56) References Cited

OTHER PUBLICATIONS

Chaudhuri et al., "An Efficient, Cost-Driven Index Selection Tool for Microsoft SQL Server," Proceedings of the 23rd VLDB Conference, vol. 97, pp. 146-155, year 1997.
Stonebraker et al., "Embedding Expert Knowledge and Hypothetical Data Bases into a Data Base System," Proceedings of the 1980 ACM SIGMOD International Conference on Management of Data, pp. 58-66, year 1980.
Valentin et al., "DB2 Advisor: An Optimizer Smart Enough to Recommend Its Own Indexes," Proceedings of the 16th IEEE International Conference on Data Engineering, pp. 101-110, year 2000.
Ma et al., "Query-based Workload Forecasting for Self-Driving Database Management Systems," Proceedings of the 2018 International Conference on Management of Data, pp. 631-645, year 2018.
Idreos et al., "Database Cracking," CIDR, vol. 7, pp. 68-78, year 2007.
Ding et al., "Tsunami: A Learned Multi-dimensional Index for Correlated Data and Skewed Workloads," Proceedings of the VLDB Endowment, vol. 14, No. 2, pp. 74-86, year 2020.
Nathan et al., "Learning Multi-dimensional Indexes," Proceedings of the 2020 ACM SIGMOD International Conference on Management of Data, pp. 985-1000, year 2020.
Chattopadhyay et al., "Procella: Unifying Serving and Analytical Data at YouTube," Proceedings of the VLDB Endowment, vol. 12, No. 12, pp. 2022-2034, year 2019.
Dageville et al., "The Snowflake Elastic Data Warehouse," Proceedings of the 2016 International Conference on Management of Data, pp. 215-226, year 2016.
Gupta et al., "Amazon Redshift and the Case for Simpler Data Warehouses," Proceedings of the 2015 ACM SIGMOD International Conference on Management of Data, pp. 1917-1923, year 2015.
Kipf et al., "Cuckoo Index: A Lightweight Secondary Index Structure," Proceedings of the VLDB Endowment, vol. 13, No. 13, pp. 3559-3572, year 2020.
Melnik et al., "Dremel: A Decade of Interactive SQL Analysis at Web Sale," Proceedings of the VLDB Endowment, vol. 13, No. 12, pp. 3461-3472, year 2020.
Moerkotte, "Small Materialized Aggregates: A Light Weight Index Structure for Data Warehousing," Reihe Informatik, No. 1, pp. 1-17, year 1998.
O'Neil et al., "The Log-Structured Merge-Tree (LSM-Tree)," Acta Informatica, vol. 33, No. 4, pp. 351-385, year 1996.
Sidirourgos et al., "Column Imprints: A Secondary Index Structure," Proceedings of the 2013 ACM SIGMOD International Conference on Management of Data, pp. 893-904, year 2013.
Vuppalapati et al., "Building an Elastic Query Engine on Disaggregated Storage," Proceedings of the 17th USENIX Symposium on Networked Systems Design and Implementation (NSDI'20), USENIX Association, pp. 448-642, year 2020.
"Apache Parquet," Website, pp. 1-2, year 2022, as downloaded from https://parquet.apache.org/.
Hentschel et al., "Column Sketches: A Scan Accelerator for Rapid and Robust Predicate Evaluation," Proceedings of the 2018 International Conference on Management of Data, pp. 857-872, year 2018.
Ott et al., "An Introduction to Statistical Methods and Data Analysis," Fifth Edition, Thomson Learning, Duxbury, pp. 1-1213, year 2001.

* cited by examiner

ADAPTIVE SPARSE INDEXING IN CLOUD-BASED DATA WAREHOUSES

FIELD OF THE INVENTION

The present invention relates generally to data storage systems, and particularly to methods and systems for adaptive indexing.

BACKGROUND OF THE INVENTION

Adaptive indexing techniques have been studied in the context of database systems, as means for pruning database tables before searching them in response to a query. Adaptive indexing has been considered as a solution for workload profiles that fluctuate over time, and in environments in which users have little knowledge regarding the workload profile. Various adaptive indexing techniques are known in the art.

For example, Chaudhuri and Narasayya describe an adaptive index selection tool in "AutoAdmin 'What-if' Index Analysis Utility," ACM SIGMOD Record. 27, 2 (1998), pages 367-378; and in "An Efficient, Cost-Driven Index Selection Tool for Microsoft SQL Server," VLDB, Vol. 97, 1997, pages 146-155.

Similar approaches have been suggested by Stonebraker and Keller in "Embedding Expert Knowledge and Hypothetical Data Bases into a Data Base System," Proceedings of the 1980 ACM SIGMOD international conference on Management of data, pages 58-66; and by Valentin et al., in "DB2 Advisor: An Optimizer Smart Enough to Recommend Its Own Indexes," Proceedings of the $16^{th}$ IEEE International Conference on Data Engineering, 2000, pages 101-110.

Ma et al. describe algorithms for recommending indexes, in "Query-based Workload Forecasting for Self-Driving Database Management Systems," Proceedings of the 2018 International Conference on Management of Data, pages 631-645. An entirely different approach is described by Idreos et. al., in "Database Cracking," CIDR, Vol. 7, 2007, pages 68-78.

In some known solutions, the indexes themselves are adaptive. Such techniques have been described, for example, by Ding et al., in "Tsunami: a learned multi-dimensional index for correlated data and skewed workloads," Proceedings of the VLDB Endowment 14, 2 (2020), pages 74-86; and by Nathan et al., in "Learning multi-dimensional indexes," Proceedings of the 2020 ACM SIGMOD International Conference on Management of Data, pages 985-1000.

SUMMARY OF THE INVENTION

An embodiment of the present invention that is described herein provides a method for querying a data storage. The method includes receiving queries for execution in the data storage, and deriving from the queries one or more table-scans over one or more tables of the data storage. Candidate sparse indexes, for pruning the table-scans, are specified based on the queries. Pruning-power measures, indicative of an effectiveness of the candidate sparse indexes in pruning the table-scans, are evaluated. One or more of the candidate sparse indexes are converted into actual sparse indexes, depending on the pruning-power measures. The queries are executed by performing the table-scans, including pruning the table-scans using the actual sparse indexes.

In some embodiments the method further includes, while performing the table-scans, evaluating the pruning-power measures for one or more of the actual sparse indexes, and dropping one or more of the actual indexes whose effectiveness is below a specified pruning power.

In some embodiments, evaluating the pruning-power measures includes simulating the candidate sparse indexes while performing the table-scans. In an example embodiment, the tables are divided into blocks of rows, and evaluating the pruning-power measures includes, for a given candidate sparse index, maintaining one or more of (i) a first count indicative of a number of the blocks that were accessed by the queries and in which the given candidate sparse index could have been used for pruning, (ii) a second count indicative of a number of the blocks that were accessed by the queries but in which the given candidate sparse index could not have been used for pruning, (iii) a third count indicative of a number of the blocks that were pruned in simulation of the given candidate sparse index, and (iv) a fourth count indicative of a number of the blocks that were not pruned in the simulation of the given candidate sparse index.

In another embodiment, the tables are divided into blocks of rows, and the method further includes deciding whether to convert a candidate sparse index into an actual sparse index, by (i) representing the blocks, over which the candidate sparse index are simulated, by respective random variables, each random variable indicative of whether the block would have been pruned by the candidate sparse index, (ii) calculating a confidence interval of a sample mean of the random variables, and (III) deciding to convert the candidate sparse index into an actual sparse index if the confidence interval is smaller than a threshold.

In yet another embodiment, receiving the queries, deriving the table-scans and simulating the candidate sparse indexes are performed in multiple compute nodes, and the method further includes synchronizing a metadata database with simulation results produced by the multiple compute nodes.

In a disclosed embodiment, specifying the candidate sparse indexes includes specifying a candidate sparse index over one or both of (i) one or more numerical columns of the one or more tables, and (ii) one or more string columns of the one or more tables. In an example embodiment, specifying the candidate sparse indexes includes specifying a candidate sparse index over a mathematical expression that is defined over two or more numerical columns of the one or more tables.

There is additionally provided, in accordance with an embodiment of the present invention, a system for querying a data storage. The system includes an interface and one or more processors. The interface is configured for communicating with the data storage. The one or more processors are configured to receive queries for execution in the data storage, to derive from the queries one or more table-scans over one or more tables of the data storage, to specify, based on the queries, candidate sparse indexes for pruning the table-scans, to evaluate pruning-power measures, indicative of an effectiveness of the candidate sparse indexes in pruning the table-scans, to convert one or more of the candidate sparse indexes into actual sparse indexes, depending on the pruning-power measures, and to execute the queries by performing the table-scans, including pruning the table-scans using the actual sparse indexes.

There is further provided, in accordance with an embodiment of the present invention, a computer software product, the product including a tangible non-transitory computer-readable medium in which program instructions are stored, which instructions, when read by a processor, cause the processor to receive queries for execution in a data storage, to derive from the queries one or more table-scans over one or more tables of the data storage, to specify, based on the queries, candidate sparse indexes for pruning the table-scans, to evaluate pruning-power measures, indicative of an effectiveness of the candidate sparse indexes in pruning the table-scans, to convert one or more of the candidate sparse indexes into actual sparse indexes, depending on the pruning-power measures, and to execute the queries by performing the table-scans, including pruning the table-scans using the actual sparse indexes.

The present invention will be more fully understood from the following detailed description of the embodiments thereof, taken together with the drawings in which:

DETAILED DESCRIPTION OF EMBODIMENTS

OVERVIEW

Embodiments of the present invention that are described herein provide improved methods and systems for processing queries in databases and other data storage systems. More specifically, the disclosed embodiments provide techniques for adaptively creating and discarding sparse indexes, which are used for pruning table-scans performed in query processing. The index creation and dropping processes are adaptive, in the sense that they continually match the indexes to the actual workload profile of the queries being processed. The description that follows refers mainly to database management systems (e.g., a cloud-based data warehouse) as a non-limiting example use-case. The disclosed techniques are applicable, however, to any other suitable type of data storage system.

In some embodiments, the data storage system comprises one or more tables in which data is stored, each table comprising one or more columns. Real-life systems typically comprise multiple tables, each comprising multiple rows and columns. A query typically specifies a predicate that is defined over one or more of the columns of one or more of the tables. Processing of a query typically begins by deriving one or more table-scans that need to be performed in order to retrieve the requested data.

One of the most effective ways to improve the performance of query processing is to prune the table-scans. In a typical pruning process, a table is divided into blocks horizontally (i.e., each block comprises a subset of the rows of the table), and the blocks are indexed by sparse indexes. During a table-scan, before scanning a given block, the predicate is first checked against the sparse index and a decision is made whether the block needs to be scanned or can be skipped.

One example of a sparse index consists of two values— The minimum and maximum values of a given column in the block. During a table-scan whose predicate specifies a range of values for the column, the sparse index of each block can be compared against the predicate, to decide whether the block might contain values within the specified range. If the answer is no, the block can be skipped ("pruned"). This kind of index is sometimes referred to as an aggregator-type index, or "Small Materialized Aggregate" (SMA). Another example of a sparse index is a Bloom filter, as is well known in the art. In some cases, aggregator-type indexes are preferable for numerical columns, whereas Bloom filters are preferred for columns of strings or other non-numerical values. This choice, however, is not mandatory. Further alternatively, the disclosed techniques can be used with any other suitable type of sparse index.

In the present context, the term "sparse index of a block" refers to any suitable metadata, which is calculated over the block and can be compared against a predicate, in order to decide whether or not the block contains data that matches the predicate. The sparse index of a block typically comprises some highly compressed statistics of the block's data. A sparse index may be permitted to have some probability of false-positives (causing unnecessary scanning of blocks that could have been skipped) but not false-negatives (which would mean skipping blocks that contain data matching the query). Depending on implementation, sparse indexes can be stored alongside their respective blocks, together in some central location, or in any other way. A sparse index is also referred to herein as a "pruning index" or simply "index" for brevity.

In some embodiments of the present invention, the data storage system comprises one or more processors (also referred to as "processing nodes" or simply "nodes") that process queries, and in particular carry out the disclosed sparse indexing methods. For the sake of clarity, the description that follows will focus on a single table. In general, however, the disclosed technique typically performed per table over plurality of tables being scanned.

For a given table, the processor maintains a data structure that is referred to as a "proposal registry." The proposal registry stores two types of proposals that are evaluated continually, namely "create proposals" and "drop-proposals." A create proposal references a candidate index that does not currently exist but may be useful to create. A drop proposal references an existing index, for continually evaluating whether to retain or discard that index.

In each create proposal and drop proposal, the processor aggregates actual execution statistics that are gathered over a large number of actual table-scans. At some point, when sufficient confidence has been gained for a given proposal, the proposal triggers an action, i.e., creation of a new index or dropping of an existing index.

Throughout the present disclosure, the term "actual index" refers to an index that is currently in actual use. The term "candidate index" refers to an index that is being evaluated and, if found effective, may be created, i.e., converted into an actual index.

In some embodiments, the processor evaluates create proposals by simulating the candidate indexes during actual table-scans. The simulation evaluates the effectiveness (i.e., the pruning power) that the candidate index would achieve if it were applied in the table-scan. In an example embodiment, the processor chooses a certain create proposal (existing or newly created), which references a certain candidate index, to be evaluated during a certain table-scan. During the table-scan, the processor simulates the operation of the candidate index, thereby estimating the candidate index's potential pruning power. The simulation is typically performed over only a small fraction of the data being scanned, in order to minimize the computational overhead added to the query processing.

The simulation results, referred to herein as pruning-power measures, are fed-back and aggregated in the create proposal. As noted above, when the candidate index of a certain create proposal is found to achieve good pruning power with sufficient confidence, the candidate index is converted into an actual index.

In some embodiments, the system comprises multiple processors ("nodes"), each maintaining its own local proposal registry with create proposals and drop proposals. The nodes occasionally (e.g., periodically, every predefined number of table-scans, every predefined number of registry updates, etc.) synchronize their proposal registries with a central registry. In these embodiments, conversion of candidate indexes into actual indexes, and dropping of actual indexes, are performed at the system level based on the collective information from the multiple nodes.

The above-described processes, including evaluation of create proposals and drop proposals by simulation of candidate indexes, and creation and dropping of actual indexes, are performed on an on-going basis during normal operation of the system, over actual queries and table-scans. In this manner, the set of actual sparse indexes used in the system is continually optimized to match the actual flow of queries being performed. If and when the query profile changes over time, the sparse indexes will adapt accordingly.

Moreover, the disclosed techniques construct the sparse indexes (at least in part) during, and as part of, the table-scanning stage, as opposed to preparatory stages such as query optimization. The resulting indexes are therefore accurately matched to the actual data and its distribution across the table. At the same time, the disclosed techniques incur only minimal computational overhead during query processing. The disclosed techniques do not require any user involvement, or user awareness, for maintaining sparse indexes. Furthermore, the disclosed techniques do not necessitate reordering or otherwise moving stored data.

System Description

Figure 1:
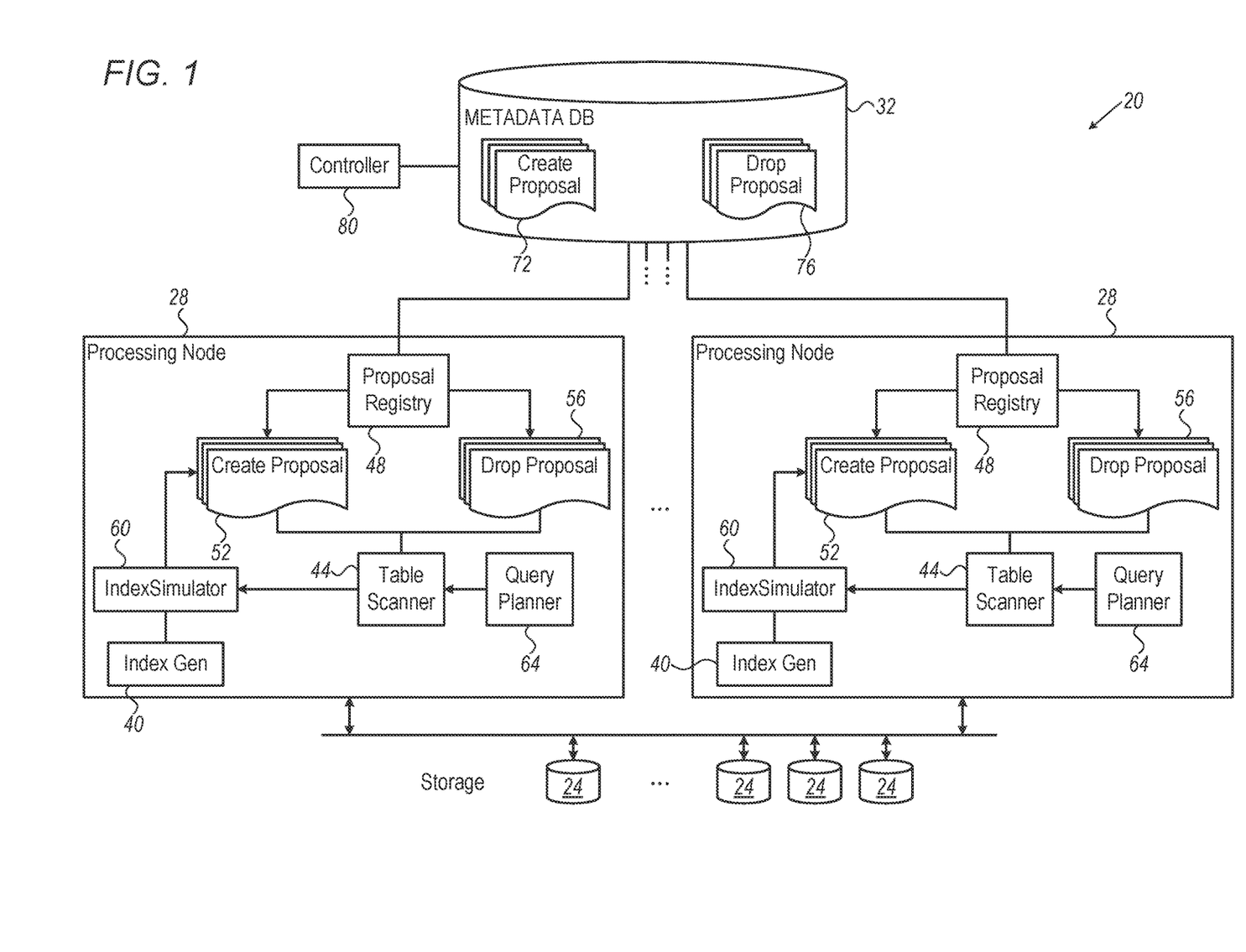
FIG. 1 is a block diagram that schematically illustrates a cloud-based data storage system that employs adaptive sparse indexing, in accordance with an embodiment of the present invention.

FIG. 1 is a block diagram that schematically illustrates a cloud-based data storage system 20 that employs adaptive sparse indexing, in accordance with an embodiment of the present invention. In the present example, system 20 is a data management system, such as a cloud-based data warehouse. System 20 comprises plurality of storage devices 24 (referred to collectively as "storage"), a plurality of processing nodes 28, a metadata database (DB) 32, and optionally a central controller 80. In one non-limiting example, metadata database 32 is implemented using FoundationDB, but any other suitable database can be used in alternative embodiments. In example embodiments, storage devices 24 and metadata database 32 may comprise Solid state disks (SSDs), and nodes 28 may comprise physical servers or Virtual Machines (Vms). Alternatively, any other suitable configuration can be used. Nodes 28 may store and retrieve data in storage devices 24 over any suitable network or other interface, and using any suitable protocol.

In some embodiments, each node 28 is independent in processing queries. In other embodiments, a given query may be broken into multiple parts for processing by different nodes 28. A given table-scan may also be divided into multiple parts for processing by different nodes 28. As part of query processing, each node 28 participates in carrying out the adaptive indexing techniques disclosed herein.

Each node 28 comprises a local proposal registry 48, in which the node maintains local create proposals 52 (proposals to create new indexes) and local drop proposals 56 (proposals to drop existing indexes). Each node 28 adapts its local create proposals and local drop proposals based on the queries being processed in that node 28. Typically, a drop proposal 56 is maintained for each actual index being used, so that the effectiveness of every actual index is continually evaluated.

Within a given node 28, adaptive sparse indexing is performed by software modules referred to as a query planner 64, a table scanner 44, an index generator 40 and an index simulator 60. Table scanner 44 also performs conventional table-scanning; the description herein puts more emphasis on the functionality relating to adaptive indexing.

The flow of creating a new sparse index is described in detail in FIG. 3 below. Briefly put, query planner 64 receives a query for processing and creates an execution plan. The execution plan comprises one or more table-scans for the query. Each table-scan specifies (i) a table, (ii) a set of one or more columns of the table, and (iii) a filter predicate that is defined over the set of columns and needs to be applied to every row. The result of a table scan typically comprises a (possibly empty) set of rows of the table, which match the filter predicate.

For at least some of the table-scans, node 28 may decide to evaluate a certain create proposal 52 during the table-scan. The create proposal references a candidate index that has been generated by index generator 40. Once a create proposal has been chosen for evaluation in a given table-scan, table scanner 44 begins performing the table-scan (an actual table-scan that retrieves data for serving the actual query). As part of the table-scan, index simulator 60 simulates the effectiveness that the candidate index would have in pruning the table-scan, if it were used as an actual pruning index. Index simulator 60 updates the create proposal in question based on the simulation results.

The above flow is repeated over multiple table-scans derived from multiple queries. As a result, proposal registries 48 in nodes 28 accumulate statistical information that indicates which candidate indexes are effective in pruning the table-scans derived from the actual queries being processed in the system.

As seen in the figure, metadata database 32 comprises (i) global create proposals 72, which are system-level aggregates of local create proposals 52 from the various nodes 28, and (ii) global drop proposals 76, which are system-level aggregates of local drop proposals 56 from the various nodes. Proposals 72 and 76 are typically stored in a serialized format. As noted above, a drop proposal 76 is typically maintained for each actual index being used, so that the effectiveness of every actual index is continually evaluated.

Each node 28 occasionally updates the global create proposals 72 and global drop proposals 76 according to the respective local create proposals 52 and local drop proposals 56. Decisions to create new indexes and to drop indexes are taken according the global create proposals 72 and global drop proposals 76. This synchronization process is demonstrated in FIG. 4 below.

In the present embodiment, the sparse indexes themselves (both candidate indexes and actual indexes) are stored on storage devices 24 alongside their respective tables. For this reason the indexes are not seen explicitly in the figure. In alternative embodiments, however, candidate and/or actual indexes can be stored in any other suitable way and/or in any other suitable location, e.g., in metadata database 32 or in main memory.

The configuration of system 20, and the configurations of its various components such as nodes 28 and metadata database 32, as shown in FIG. 1, are example configurations that are depicted purely for the sake of conceptual clarity. In alternative embodiments, any other suitable configurations can be used. For example, the system may comprise only a single node 28, in which case metadata database 32 may be omitted. As another example, controller 80 may be omitted.

In various embodiments, the various components of system 20 may be implemented using any suitable hardware, using software, or using a combination of hardware and software elements. In some embodiments, some or all of the elements of system 20, e.g., the processors of nodes 28 and/or controller 80, may be implemented using programmable processors that are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 2:
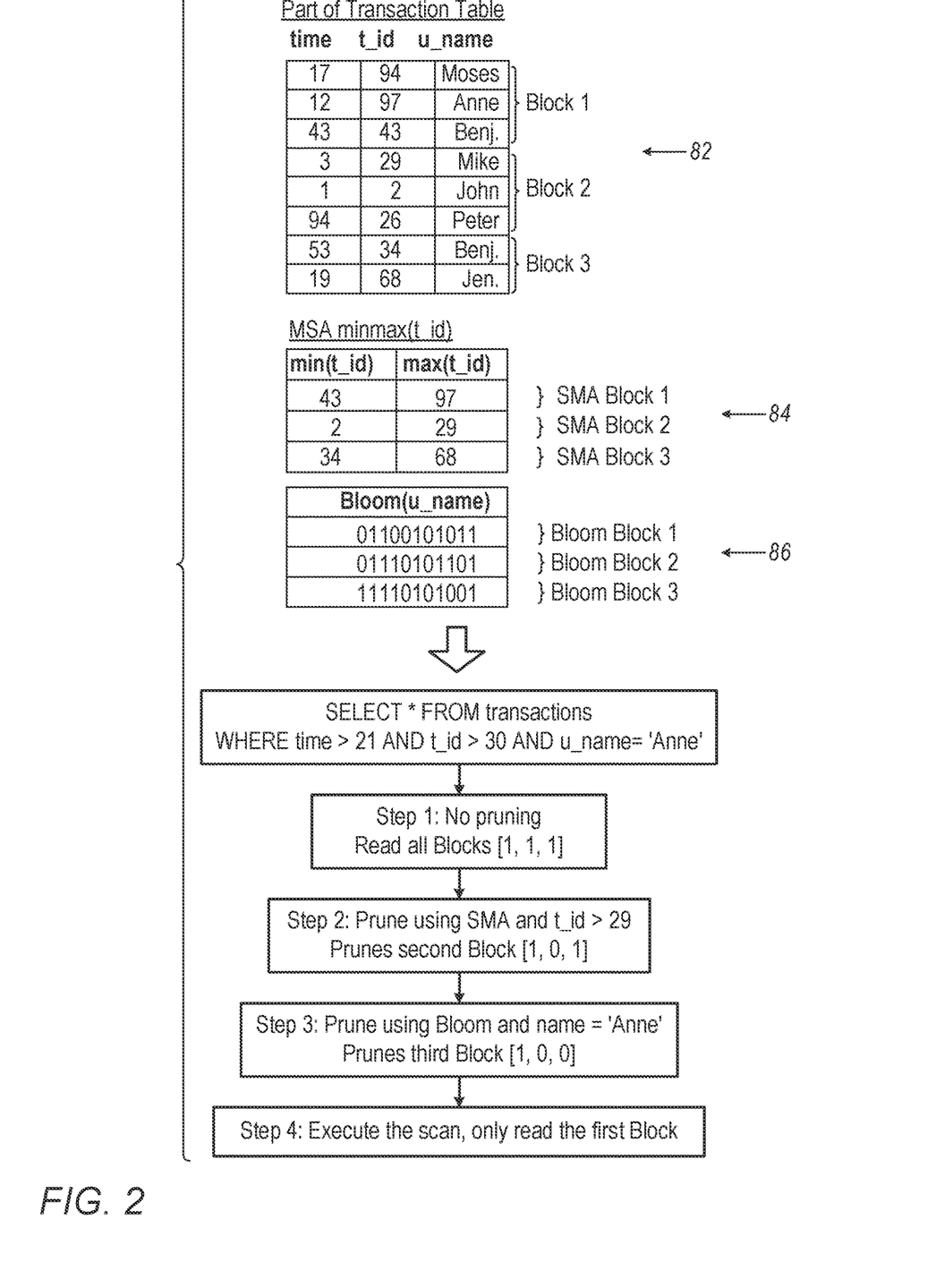
FIG. 2 is a diagram showing example sparse indexes used in the system of FIG. 1, in accordance with an embodiment of the present invention.

FIG. 2 is a diagram showing example sparse indexes that can be used in system 20, in accordance with an embodiment of the present invention. The example of FIG. 2 demonstrates how table scanner 44 can prune a table-scan over a transaction table 82 using an aggregator index 84 ("Small Materialized Aggregate"—SMA, in the present example a minimum-maximum aggregator) and a Bloom filter index 86.

In the present example, table 82 comprises three columns (a numeric "time" column, a numeric "t_id" column, and a string column denoted "u_name"). Table 82 is divided into three blocks. Aggregator index 84 comprises three SMA blocks. Each SMA block in index 84 gives the minimum and maximum values of the "t_id" column in the corresponding block of table 82. Bloom filter index 86 comprises three Bloom blocks. Each Bloom block in index 86 is a Bloom filter defined for the "u_name" column of the corresponding block of table 82.

The bottom of FIG. 2 shows how a table-scan over table 82 can be pruned effectively using indexes 84 and 86. As seen, the predicate in this example requests the transactions (rows of table 82) in which time>32, t_id>30, and u_name='Anne'.

In Step 1, table scanner 44 checks for possible pruning based on the condition "time>21". Since there is no index defined over this column, no pruning is possible, and all three blocks are read.

In Step 2, table scanner 44 checks for possible pruning based on the condition "t_id>30 ". Based on SMA index 84, this condition enables the table scanner to prune the second block of table 82.

In Step 3, table scanner 44 checks the remaining blocks of table 82 for possible pruning based on the condition "u_name=-'Anne'". Based on Bloom index 86, this condition enables the table scanner to prune the third block of table 82.

In Step 4, the only block that was not pruned is the first block of table 82. Thus, table scanner 44 reads only the first block from storage devices 24, and scans it. As can be appreciated, the pruning operation provides considerable performance gain to the table-scan, and to processing of the query in general.

Adaptive Creation and Dropping of Sparse Indexes Based on Actual Query Workflow

Figure 3:
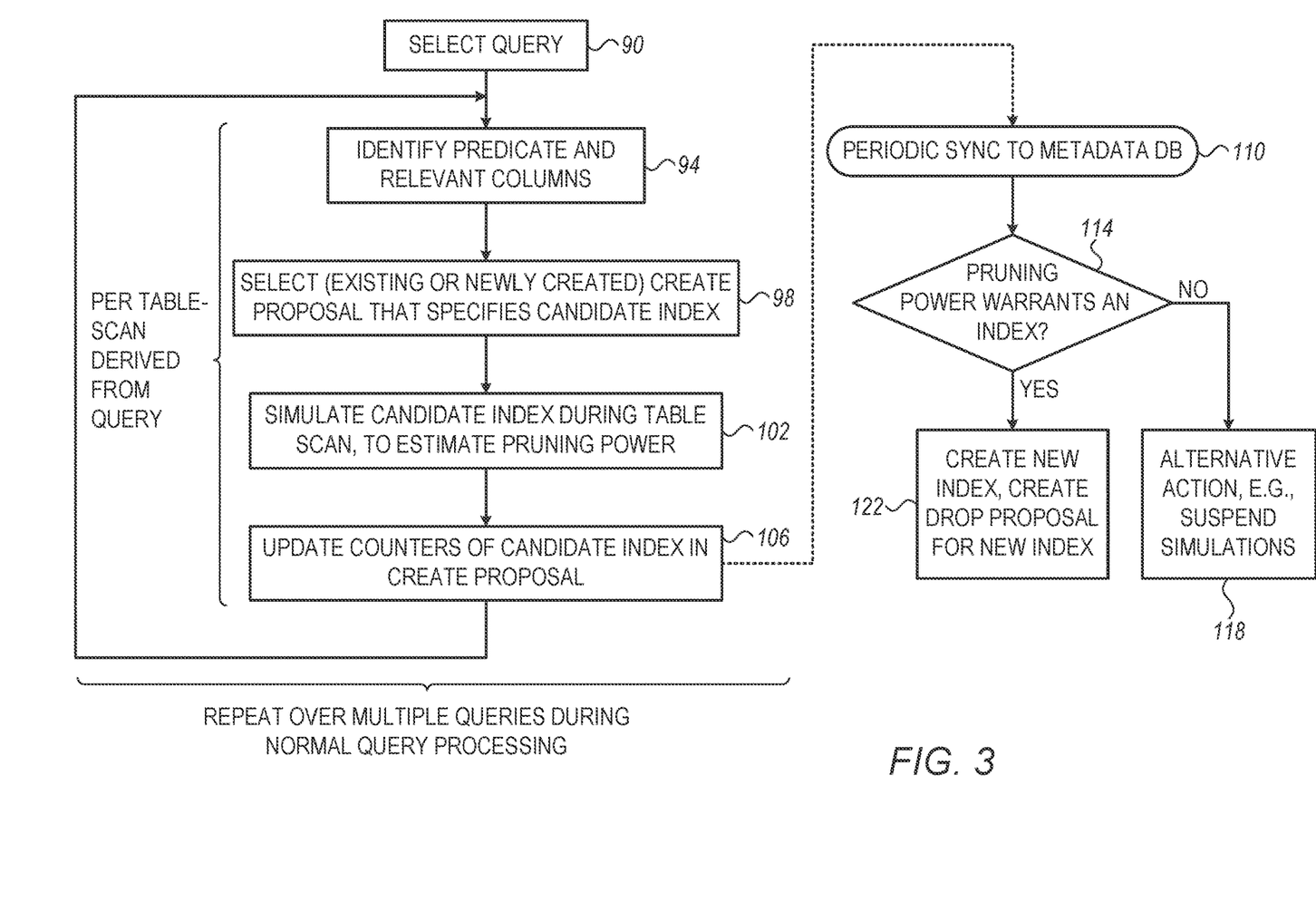
FIG. 3 is a flow chart that schematically illustrates a method for adaptive creation of a sparse index, in accordance with an embodiment of the present invention.

FIG. 3 is a flow chart that schematically illustrates a method for adaptive creation of a sparse index in system 20, in accordance with an embodiment of the present invention. The left-hand side of the flow chart illustrates the process of collecting statistics regarding the effectiveness (pruning power) of various create proposals. This process is carried out in parallel by the multiple nodes 28 of system 20, as part of processing real-life queries during normal operation of the system. The right-hand side of the flow chart illustrates the process in which a node 28 synchronizes periodically to metadata database 32, including possible creation of an actual index.

In a given node 28, the method begins with query planner 64 selecting a query for processing, at a query selection stage 90. At a table-scan definition stage 94, table scanner 44 derive a table-scan from the selected query, including specifying a filter predicate and one or more columns for the table-scan. At a create-proposal selection stage 98, table scanner 44 chooses a create proposal that will be evaluated as part of the table-scan.

For a given table-scan, table scanner 44 may either (i) choose an existing create proposal 52 in proposal registry 48, (ii) create a new create proposal 52 and add it to proposal registry 48, or (iii) decide that no create proposal will be evaluated in the table-scan. Example techniques for selecting suitable create proposals for evaluation are given further below. Assuming the decision is to evaluate a selected create proposal (existing newly created), the method proceeds.

The selected create proposal 52 references (i.e., corresponds to, or points to) a Certain candidate index whose effectiveness is being evaluated by the create proposal. At an index simulation stage 102 (which is performed during and as part of the table-scan), index simulator 60 simulates the effectiveness of the candidate index. In the simulation, index simulator 60 estimates the pruning power that the candidate index would have in pruning the blocks of the table being scanned, if it were deployed as an actual index.

In some embodiments, index simulator 60 performs the simulation over only a small fraction of the blocks that participate in the table-scan. The size of the fraction is chosen as a trade-off between simulation accuracy and computational overhead. In an example embodiment, simulator 60 performs the simulation over 0.1% of the blocks, Alternatively, however, any other suitable fraction can be used.

The simulation results obtained by simulator 60 are also referred to herein as "pruning-power measures" of the candidate index. In some embodiments, the simulation results comprise four counter values, which are indicative of the potential pruning power of the candidate index:

'blocks_index_usable'—The number of blocks in which the candidate index could have been used for pruning.

'blocks_index_unusable'—The number of blocks in which the candidate index could not have been used for pruning.

'blocks_pruned_simulation'—The number of blocks that were pruned by the candidate index.

'blocks_not_pruned_simulation'—The number of blocks that were not pruned by the candidate index.

It is important to note that, in a given table-scan, table scanner 44 updates a given create proposal 52 even if the create proposal could not be used in the table-scan. In such a case the table scanner updates the 'blocks_index_unusable' counter with the number of blocks that were read in the table-scan. Table scanner 44 also typically updates every create proposal 52 that could have been used but was not simulated, by updating the 'blocks_index_usable' counter with the number of blocks that were read in the table-scan. These updates are needed in order to estimate the pruning power correctly.

At a proposal updating stage 106, index simulator 60 updates a state of the evaluated create proposal 52 in proposal registry 48. When using the above-described counter mechanism, for example, each create proposal 52 in registry 48 comprises a state having four counters. These counters accumulate the counter values obtained from multiple simulations of the create proposal in multiple table-scans. Thus, upon completing the simulation, at stage 106, index simulator 60 increments each of the four counters of the create proposal by the corresponding counter value obtained in the simulation.

If the query selected at stage 90 warrants additional table-scans, the method loops back to step 94 above. In other words, stages 94-106 are performed for every table-scan derived from the selected query. The process of stages 90-106 is repeated multiple times by nodes 28, over multiple queries, during the normal operation of system 20. As a result, proposal registries 48 of nodes 28 accumulate statistically meaningful pruning-power measures of multiple different candidate indexes.

Occasionally, e.g., periodically, a given node 28 decides to synchronize to metadata database 32, at a synchronization stage 110. As part of the synchronization process, the node updates the states of the various global create proposals 72 with the states of the local create proposals 52. An example of this process is given in FIG. 4 below.

In some embodiments, the time interval between successive synchronizations depends on the activity load on the node (e.g., on the update frequency of the node's proposal registries). For example, a node may trigger an update of the metadata database after a predefined number of updates of the local proposal registry. As a result, nodes That are highly busy in processing queries (and therefore accumulate simulation results relatively rapidly) will synchronize more often than nodes that are idle. This mechanism reduces the computation and communication overhead incurred by synchronization.

After updating the state of a certain global create proposal 72, at an index creation checking stage 114, the node checks whether the update pruning-power measures (e.g., counter values) of the candidate index are worthy of creating a new actual index. If the answer is positive, the node creates a new actual index, at an index creation stage 122. At the same time, the node typically also creates a drop proposal 76 for the new actual index. If the answer at stage 114 is negative, the node takes an alternative action, at an alternative stage 118. For example, the node may decide to suspend simulations of the candidate index temporarily, or to drop the candidate index altogether. Example criteria and actions are given further below.

The method flow of FIG. 3 is an example flow that is depicted purely for the sake of conceptual clarity. In alternative embodiments, any other suitable flow can be used.

Figure 4:
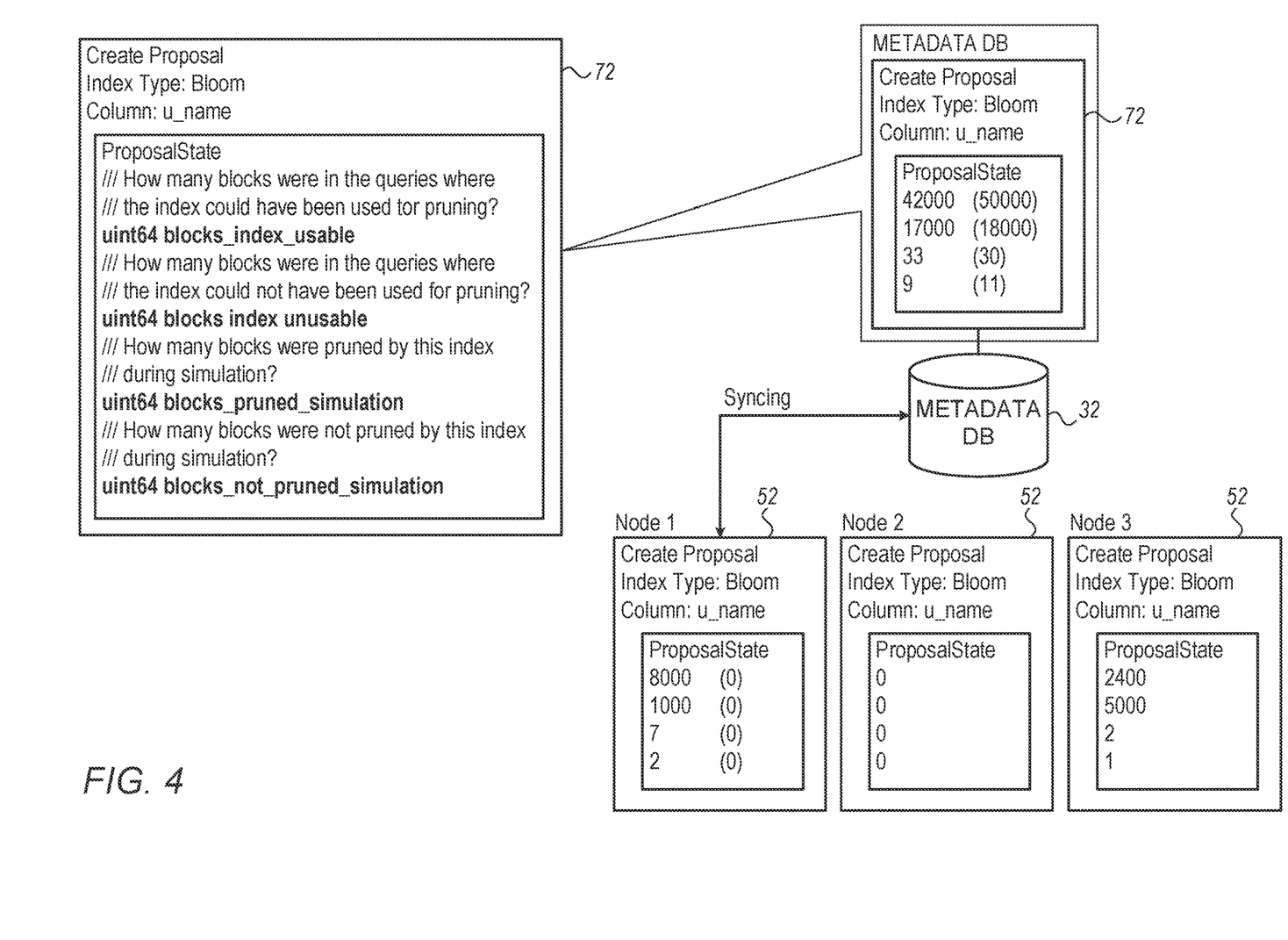
FIG. 4 is a diagram that schematically illustrates a structure of a create proposal, and a process of updating the state of a create proposal, in accordance with an embodiment of the present invention.

FIG. 4 is a diagram that schematically illustrates a structure of a global create proposal 72, and a process of updating the state of a global create proposal 72 with the state of a local create proposal 52, in accordance with an embodiment of the present invention. This process is typically performed by a node 28 during its synchronization to metadata database 32 (e.g., at stage 110 of FIG. 3 above).

The left-hand side of FIG. 4 shows the structure of global create proposal 72. In the present example, the candidate index corresponding to the create proposal is a Bloom-filter index, which is defined. over the "u_name" column of transaction table 82 (FIG. 2). The state of create proposal 72 comprises the four counters described above.

The right-hand side of FIG. 4 illustrates an example process in which one of nodes 28 (denoted "Node 1" in the figure) updates the state of the global create proposal (72) with the counter values of the corresponding local instance of that create proposal (52). Both in the local create proposal and in the global create proposal, the counter values on the left are the values before synchronization, and the counter values on the right (in parentheses) are the values after synchronization. As seen, after incrementing the counter values of the global create proposal, the node resets the respective local counter values to zero.

Also seen in the present example are the local instances of the create proposal in "Node 2" and "Node 3". The counter values in Node 2 are all zero, as they would be, for example, immediately following synchronization to database 32. The counter values in Node 3 have some interim values, as they would be, for example, at some intermediate stage between synchronizations. The local counters are typically reset to zero on initialization, and following each synchronization to the metadata database.

FIG. 4 refers to a sparse index created over a single string column, in the present example 'u_name'. Generally, the disclosed technique can be applied to any other suitable type and number of columns, or even to mathematical expressions defined over columns. For example, a sparse index can be created, simulated and used over the sum of two or more numerical column (e.g., user_age+user_account_balance).

Additional Details, Variations and Embodiments

Choosing Create Proposals

In various embodiments, table scanner 44 in a given node 28 may use various techniques for (i) choosing which create proposals are to be evaluated in general, and (ii) which create proposal is to be simulated in a given table-scan. Table scanner typically makes the latter decision in a dedicated index analysis pass, which is performed before the execution of a table-scan (see, for example stage 98 of FIG. 3 above). In an example embodiment, table scanner 44 chooses a create proposal for evaluation in a given table-scan by carrying out an algorithm specified in the following pseudo-code:

Data: Predicate for a table scan.
Result: A new or existing create proposal for evaluation.
  proposal=ϕ;
for prop registry.create_proposals ( ) do
   if predicate.can_use (prop) then
      proposals.add(prop);
   end
end
if !propasals.empty ( ) then
   if bernoulli.sample (0.9) then
      return proposals.pick_uniform ( )
   end
end
used columns=predicate.get_used_columns ( );
for column ∈ used_columns do
   prop=build_new_proposal (column);
   if predicate.can_use (prop) then
      registry.reqister_propose (prop) ;
      return prop;
   end
end
return null;

The algorithm above is chosen purely by way of example. In alternative embodiments, any other suitable algorithm can be used. In accordance with the above example algorithm, table scanner 44 first queries proposal registry 48 of the table in question, to find out which create proposals 52 exist. Table scanner 44 then collects the set of existing create proposals which might be useful, given the predicate used in the table-scan. This process is typically performed by iterating through the proposal registry. If the set of suitable create proposals is non-empty, table scanner 44 ignores the suitable proposals with a probability of 10%, or uniformly chooses one of the suitable create proposals for evaluation.

If no suitable create proposal is found, or a suitable create proposal was ignored in the previous iteration, table scanner 44 attempts to create a new create proposal 52. To this end, table scanner 44 first retrieves the columns that are accessed within the filter predicate of the table-scan. These columns might be useful for a new candidate index. Table scanner 44 iterates over the columns, turns them into a create proposal, and checks whether that index type might be useful given the predicate. The first create proposal that is found potentially useful is pushed into proposal registry 48 and is evaluated within the table-scan. If no column resulted in a useful create proposal, table scanner 44 does not evaluate any create proposal in the table-scan.

When using the above algorithm, table scanner 44 may use various techniques for deciding whether the predicate of the table-scan can utilize a given create proposal 52 (this decision is given as the return value of the can_use ( ) function in the pseudo-code above). A predicate can utilize a create proposal if the proposed candidate index might have pruning power given the predicate. In other words, table scanner 44 typically looks for candidate indexes that could be used in the table-scan pruning pass if they existed.

For aggregator-type ("SMA") indexes: Given a predicate p, an SMA index on a column a can be used within the pruning pass of a table-scan if p is of the form (αOPc) AND $\tilde{p}$, wherein $\tilde{p}$ denotes an arbitrary other predicate, c is a constant, and OP$\in\{<, \leq, >, \geq, =\}$.

For Bloom-filter indexes: Given a predicate p, a Bloom index on a column a can be used within the pruning pass of a table-scan if p is of the form (α=AND $\tilde{p}$, wherein $\tilde{p}$ denotes an arbitrary other predicate and c is a constant.

In an embodiment, the formal definitions above specify when a predicate allows an index to be used for pruning within a table-scan. In the case of a Bloom filter, the indexed column should be part of an equality condition with a constant value. If this condition is satisfied, then the content of the predicate $\tilde{p}$ does not matter. It is always possible to query the Bloom filters for the existence of the value α. If that value does not exist, i.e., the Bloom filter returns false, then the entire predicate cannot be satisfied on the corresponding block.

Both SMA and Bloom indexes can be used on numeric and string columns. However, SMA indexes are most commonly used on numeric columns while Bloom indexes are most commonly used on string columns. Given the above definitions, it can be seen that if a Bloom index might be useful for a certain column, then an SMA index might be useful as well. However, this does not mean that we expect the SMA index to always possess more pruning power. For example, for an unsorted, high cardinality column that is mostly queried through equality predicates, Bloom filters will typically provide far better pruning power.

While the above conditions are correct, they are not exhaustive. In some embodiments, an actual predicate analysis pass can make use of more complex predicate structures.

Reference is now made to the fall-through path in the pseudo-code above. This path allows table-scanner 44 to evaluate both an SMA index and a Bloom filter index on the same column. As seen above, any predicate which is useful for a Bloom index is also useful for an SMA index. If the fall-through path did not exist and an SMA index was being evaluated already, a Bloom index would never be proposed. The fall-through path enables table scanner 44 to propose multiple different index types on the same column at any given time.

Simulation of Candidate Indexes During Table-Scans

In various embodiments, index simulator 60 in a given node 28 may use various techniques for stimulating the performance of a candidate index during a table-scan (see, for example, stage 102 of FIG. 3 above).

In one possible embodiment, simulator 60 may actually construct the index in question on the relevant data files being accessed. The simulator can then check, for every block, whether that block would be pruned by the newly constructed index. This solution allows the simulator to compute the fraction of blocks that could be pruned, thereby estimating the pruning power. As can be appreciated, this solution is costly in terms of computational overhead. On the other hand, the resulting pruning power estimation is exact, since the process is in fact a calculation and not a simulation or estimation.

In another possible embodiment, a highly efficient yet imprecise approach is to estimate the pruning power as the fraction of tuples for which the predicate is true and that are then passed on to the parent operator. In this approach, the actual selectivity of the predicate is used as a proxy for the expected pruning power of the index. This estimation is free, in terms of computational overhead—It does not incur additional runtime cost since the predicate needs to be evaluated anyhow. However, for various reasons the selectivity of the filter predicate in the table-scan may be a gross over of the actual pruning power of an index.

In some embodiments, index simulator 60 uses a balanced approach, which constructs and evaluates a candidate index over only a small subset of the blocks being read in the table-scan. The subset is chosen sufficiently small to incur negligible performance overhead. At the same time, the subset is chosen sufficiently large to provide a solid pruning power estimate.

For each block in the chosen subset, index simulator 60 applies the candidate index to the block to retroactively decide whether the index could have pruned the block. Simulator 60 stores both the number of blocks which could have been pruned, and the number of blocks that could not have been pruned, as counters in the create proposal 52 of the candidate index. The benefit of the latter approach is that, for the blocks for which the index is constructed, the estimation of pruning power is exact. At the same time, since the index is constructed and evaluated only for a small fraction of the blocks, scan performance remains high.

In an embodiment, the percentage of blocks in the subset (i.e., for which a candidate index is constructed and simulated) can be chosen using statistical inference. If the index exists, the blocks being read during table-scans can be modeled as independent and identically distributed (iid) Bernoulli random variables. The outcome of each Bernoulli trial indicates whether the respective block was pruned by the index. If the index is simulated on n blocks during the evaluation phase, simulator 60 obtains observations of iid random variables $X_1, X_2, \ldots, X_n \sim$ Bernoulli (p), wherein p denotes the success probability of the index pruning a block, which is the sought pruning power estimate.

In an example implementation of the latter approach, during the execution of a table-scan, simulator 60 simulates a candidate index on a block with a probability of 0.1%. If simulator 60 decides to simulate the index on a given block, the simulator (possibly using index generator 40) constructs the candidate index on the block and checks whether the block would be pruned if the index had existed beforehand. As explained above, the create proposal of the candidate index comprises counters for both pruned and non-pruned blocks during simulation. Simulator 60 updates the counters based on the simulation result.

In many practical scenarios, it is sufficient to simulate the index on a few hundred megabytes of data to estimate the pruning power with high confidence. This quantity corresponds to a few hundred gigabytes of table-scans, which is considered a modest amount in cloud-based data warehouses.

Making Index Creation Decisions

As explained above (with reference to stages 110-122 of FIG. 3 and to FIG. 4), nodes 28 occasionally synchronize their local proposal registries 48 to metadata database 32. In this manner, the global counters relating to each candidate index are kept up-to-date based on the index simulations performed on the various nodes.

In an embodiment, the decision whether to convert a candidate index into an actual index can be performed by any node 28, after it has updated the global counter values of global create proposal 72 with the respective local counter values of local create proposal 52. Following synchronization, node 28 checks whether enough evidence was collected to make a decision.

For example, the node may estimate the pruning power of the simulations p, and approximate how much statistical confidence it has in the estimate. Using the statistical inference notation above, pruning observations are represented as iid random variables $X_1, X_2, \ldots, X_n$~Bernoulli(p), wherein $X_i$ corresponds to a respective block. The value of $X_i$ equals "1" if and only if the block could have been pruned if an index had existed. To estimate p, we utilize the sample mean. We thus estimate p as $$\hat{p} = \left(\sum_{i=1}^{n} X_i\right)/n.$$

A 95% confidence interval can then be calculated using the normal approximation of the binomial distribution. This corresponds to $\hat{p} \pm z \cdot \sqrt{((\hat{p} \cdot (1-\hat{p}))/n)}$, wherein z denotes the 1−0.95/2 quantile of the standard normal distribution.

Node 28 proceeds to make a decision only in response to the width of the confidence interval becoming less than 0.02 (i.e., 1% in either direction). If this is not the case, the statistical evidence is considered. insufficient, and synchronization proceeds without making any decision on creation of an actual index.

If sufficient statistical evidence has been collected, node 28 convert the candidate index into an actual index. First, the node estimates the real pruning power that is expected based on $\hat{p}$. In this estimate, node 28 also includes the queries in which the candidate index could not have been used. Using the counters in the state of global create proposal 72, node 28 can estimate the number of blocks that would have been pruned as $b_p = \hat{p} \cdot$ blocks_index_usable. Node 28 also estimates the number of blocks that would not have been pruned as $b_u = (1-\hat{p}) \cdot$ blocks_index_usable+blocks_index_unusable. Finally, node 28 estimates the real expected pruning power as $\hat{p} = b_p/(b_p + b_u)$.

Based on this value of the real pruning power, In an embodiment, node 28 is able to take one of the following three decisions:

$0 \leq \hat{p} < 0.02$: The candidate index has almost no pruning power. Node 28 blocks further simulations of this index (on all nodes) for a predefined period (e.g., three days) to avoid wasting additional queries on simulating the create proposal in question.

$0.02 \leq \hat{p} < 0.05$: The candidate index has some pruning power, but not enough to warrant construction of an actual index. Node 28 resets all counters of the create proposal and re-evaluates the candidate index based on new table-scans. The underlying assumption is that the workload may change in the future to favor this create proposal.

$0.05 \leq \hat{p} \leq 1$: The candidate index has significant pruning power. Node 28 decides to construct an actual index from the candidate index. In practice, more than 5% speedup can be expected on the average scan time of this table.

In some embodiments, node 28 makes the above decisions using a dedicated state machine for the create proposal. The state machine comprises a state enum, as well as a timestamp containing the last state update. If the decision is to create an actual index, the relevant create proposal is deleted, a new schema version is created, and a drop proposal is instantiated for the new index.

Making Index Drop Decisions

In some embodiments, nodes 28 decide to drop an actual index by evaluating the actual pruning power of the index. Since actual indexes are used for pruning of actual table-scans, there is no need for simulation for estimating their pruning power. In some embodiments, nodes 28 maintain local drop proposals 56 and global drop proposals 76 for this purpose. Once a significant amount of data was collected, which shows that the pruning power of a certain actual index dropped below a certain threshold level, the actual index is dropped. The threshold level can be set, for example, to 25% of the pruning power that would be required for creation of that index.

Lazy Index Construction

In some embodiments, the actual indexes are embedded in the stored data blocks or files in storage 24. In some embodiments, once a decision to create a new actual index is made, node 28 creates the index and updates the data files a gradual ("lazy") manner, without degrading query performance.

For example, node 28 may detect that certain blocks do not yet contain the index. For these blocks, node 28 performs a full read. In this manner, an index can be built partially, and performance can be improved gracefully as more of the blocks are covered by the respective index.

When the decision to create an index is issued, a new version of the table's schema is written to metadata database 32. All nodes 28 of the respective customer are notified of the changed schema and update their local schemas to reflect the change. In this manner, new data which is ingested on some of the nodes will from now on automatically contain the new actual index.

In addition, in some embodiments, nodes 28 update existing blocks to contain the new actual index. In this manner, the new actual index is gradually applied to historical data, as well, and not only to newly ingested data. Nodes 28 typically perform this updating process lazily in the background. In one embodiment, a centralized process can lazily queue index construction. tasks on nodes 28. These tasks are only executed when the overall query pressure is low and CPU resources are available. This solution enables the system to use free CPU resources for maintenance tasks without degrading query performance. Alternatively, the system may comprise one or more dedicated maintenance nodes which are responsible for executing background tasks, e.g., to improve the data layout or add indexes.

Although the embodiments described herein mainly address database management systems such as cloud-based data warehouses, the methods and systems described herein can also used in other applications, such as in streaming data processing systems, data visualization systems, and dashboarding software, to name only a few examples.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for querying a data storage, the method comprising:
   receiving a workload of multiple queries for execution in the data storage;
   deriving from the multiple queries one or more table-scans over one or more tables of the data storage;
   for a given table among the one or more tables, specifying, based on the multiple queries, candidate sparse indexes for pruning the table-scans pertaining to the given table;
   evaluating pruning-power measures, each pruning-power measure being indicative of an effectiveness of a respective candidate sparse index in pruning the table-scans pertaining to the given table, the effectiveness being assessed over the multiple queries of the workload;
   converting one or more of the candidate sparse indexes into actual sparse indexes, depending on the pruning-power measures; and
   executing the queries by performing the table-scans, including pruning the table-scans pertaining to the given table using the actual sparse indexes.

2. The method according to claim 1, further comprising, while performing the table-scans, evaluating the pruning-power measures for one or more of the actual sparse indexes, and dropping one or more of the actual indexes in response to finding that the effectiveness of the one or more of the actual indexes is below a specified pruning power.

3. The method according to claim 1, wherein evaluating the pruning-power measures comprises simulating the candidate sparse indexes while performing the table-scans.

4. The method according to claim 3, wherein the tables are divided into blocks of rows, and wherein evaluating the pruning-power measures comprises, for a given candidate sparse index, maintaining one or more of:
   a first count, indicative of a number of the blocks that were accessed by the queries and in which the given candidate sparse index could have been used for pruning;
   a second count, indicative of a number of the blocks that were accessed by the queries but in which the given candidate sparse index could not have been used for pruning;
   a third count, indicative of a number of the blocks that were pruned in simulation of the given candidate sparse index; and
   a fourth count, indicative of a number of the blocks that were not pruned in the simulation of the given candidate sparse index.

5. The method according to claim 3, wherein the tables are divided into blocks of rows, and comprising deciding whether to convert a candidate sparse index into an actual sparse index, by:
   representing the blocks, over which the candidate sparse index are simulated, by respective random variables, each random variable indicative of whether the block would have been pruned by the candidate sparse index;
   calculating a confidence interval of a sample mean of the random variables; and
   deciding to convert the candidate sparse index into an actual sparse index if the confidence interval is smaller than a threshold.

6. The method according to claim 3, wherein receiving the queries, deriving the table-scans and simulating the candidate sparse indexes are performed in multiple compute nodes, and comprising synchronizing a metadata database with simulation results produced by the multiple compute nodes.

7. The method according to claim 1, wherein specifying the candidate sparse indexes comprises specifying a candidate sparse index over one or both of (i) one or more numerical columns of the given table, and (ii) one or more string columns of the given table.

8. The method according to claim 1, wherein specifying the candidate sparse indexes comprises specifying a candidate sparse index over a mathematical expression that is defined over two or more numerical columns of the tables given table.

9. A system for querying a data storage, the system comprising:
   an interface for communicating with the data storage; and
   one or more processors, configured to:
      receive a workload of multiple queries for execution in the data storage;
      derive from the multiple queries one or more table-scans over one or more tables of the data storage;
      for a given table among the one or more tables, specify, based on the multiple queries, candidate sparse indexes for pruning the table-scans pertaining to the given table;
      evaluate pruning-power measures, each pruning-power measure being indicative of an effectiveness of a respective candidate sparse index in pruning the table-scans pertaining to the given table, the effectiveness being assessed over the multiple queries of the workload;

convert one or more of the candidate sparse indexes into actual sparse indexes, depending on the pruning-power measures; and execute the queries by performing the table-scans, including pruning the table-scans pertaining to the given table using the actual sparse indexes.

10. The system according to claim 9, wherein the one or more processors are configured to, while performing the table-scans, evaluate the pruning-power measures for one or more of the actual sparse indexes, and drop one or more of the actual indexes in response to finding that the effectiveness of the one or more of the actual indexes is below a specified pruning power.

11. The system according to claim 9, wherein the one or more processors are configured to evaluate the pruning-power measures by simulating the candidate sparse indexes while performing the table-scans.

12. The system according to claim 11, wherein the tables are divided into blocks of rows, and wherein the one or more processors are configured to evaluate the pruning-power measures by maintaining, for a given candidate sparse index, one or more of:

a first count, indicative of a number of the blocks that were accessed by the queries and in which the given candidate sparse index could have been used for pruning;

a second count, indicative of a number of the blocks that were accessed by the queries but in which the given candidate sparse index could not have been used for pruning;

a third count, indicative of a number of the blocks that were pruned in simulation of the given candidate sparse index; and a fourth count, indicative of a number of the blocks that were not pruned in the simulation of the given candidate sparse index.

13. The system according to claim 11, wherein the tables are divided into blocks of rows, and the one or more processors are configured to decide whether to convert a candidate sparse index into an actual sparse index, by:

representing the blocks, over which the candidate sparse index are simulated, by respective random variables, each random variable indicative of whether the block would have been pruned by the candidate sparse index;

calculating a confidence interval of a sample mean of the random variables; and deciding to convert the candidate sparse index into an actual sparse index if the confidence interval is smaller than a threshold.

14. The system according to claim 11, wherein the one or more processors are multiple processors comprised in multiple compute nodes, and wherein the multiple processors are configured to synchronize a metadata database with simulation results produced in the multiple compute nodes.

15. The system according to claim 9, wherein the one or more processors are configured to specify a candidate sparse index over one or both of (i) one or more numerical columns of the given table, and (ii) one or more string columns of the given table.

16. The system according to claim 9, wherein the one or more processors are configured to specify a candidate sparse index over a mathematical expression that is defined over two or more numerical columns of the given table.

17. A computer software product, the product comprising a tangible non-transitory computer-readable medium in which program instructions are stored, which instructions, when read by a processor, cause the processor to:

receive a workload of multiple queries for execution in a data storage;

derive from the multiple queries one or more table-scans over one or more tables of the data storage;

for a given table among the one or more tables, specify, based on the multiple queries, candidate sparse indexes for pruning the table-scans pertaining to the given table;

evaluate pruning-power measures, each pruning-power measure being indicative of an effectiveness of a respective candidate sparse index in pruning the table-scans pertaining to the given table, the effectiveness being assessed over the multiple queries of the workload;

convert one or more of the candidate sparse indexes into actual sparse indexes, depending on the pruning-power measures; and execute the queries by performing the table-scans, including pruning the table-scans pertaining to the given table using the actual sparse indexes.

* * * * *